(12) United States Patent
Ramanujam et al.

(10) Patent No.: US 11,112,129 B2
(45) Date of Patent: Sep. 7, 2021

(54) HVAC UNIT CENTERING SYSTEMS AND METHODS

(71) Applicant: Johnson Controls Technology Company, Auburn Hills, MI (US)

(72) Inventors: Sriram Ramanujam, Chennai (IN); Amit R. Chothave, Nashik (IN); Karan Garg, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 208 days.

(21) Appl. No.: 16/113,994

(22) Filed: Aug. 27, 2018

(65) Prior Publication Data

US 2020/0063986 A1     Feb. 27, 2020

Related U.S. Application Data

(60) Provisional application No. 62/722,682, filed on Aug. 24, 2018.

(51) Int. Cl.
*F24F 1/06* (2011.01)
*F24F 3/052* (2006.01)
*F24F 13/32* (2006.01)

(52) U.S. Cl.
CPC ............... *F24F 1/06* (2013.01); *F24F 3/052* (2013.01); *F24F 13/32* (2013.01); *F16B 2200/50* (2018.08); *F24F 2221/16* (2013.01)

(58) Field of Classification Search
CPC .... F24F 13/20; F24F 1/06; F24F 3/052; F24F 13/32; F24F 2221/32; F24F 2221/16; F24F 2221/36; E04D 13/1475; E04D 3/362; Y10S 62/16; F16B 2200/50; E04B 7/024

See application file for complete search history.

(56) References Cited

U.S. PATENT DOCUMENTS

| 2,087,224 | A | * | 7/1937 | Zeeman | .................... | E01B 9/60 |
|  |  |  |  |  |  | 238/336 |
| 3,878,655 | A | * | 4/1975 | Toth | .......................... | E04B 1/98 |
|  |  |  |  |  |  | 52/27 |
| 4,118,083 | A | * | 10/1978 | Lackey | .................... | F24F 1/022 |
|  |  |  |  |  |  | 165/47 |
| 4,513,939 | A | * | 4/1985 | Berger | .................... | F24F 13/32 |
|  |  |  |  |  |  | 248/544 |
| 4,574,549 | A | * | 3/1986 | Holcombe | ......... | E04D 13/1625 |
|  |  |  |  |  |  | 52/404.3 |

(Continued)

FOREIGN PATENT DOCUMENTS

WO    WO-2018023016 A1 *  2/2018  ............ F24S 25/615

*Primary Examiner* — Frantz F Jules
*Assistant Examiner* — Martha Tadesse
(74) *Attorney, Agent, or Firm* — Fletcher Yoder, P.C.

(57) ABSTRACT

The present disclosure relates to a centering system for a heating, ventilation, and/or air conditioning (HVAC) unit to be mounted to a curb. The centering system includes a centering wedge configured to couple to a base rail of the HVAC unit, the base rail having a lateral surface and a base surface along a length of the HVAC unit. The centering wedge includes an angled surface configured to extend between the lateral surface of the base rail and the base surface of the base rail. The angled surface is configured to contact the curb during installation of the HVAC unit to guide the HVAC unit toward a centered position on the curb.

9 Claims, 9 Drawing Sheets

(56) References Cited

U.S. PATENT DOCUMENTS

| | | | | |
|---|---|---|---|---|
| 4,598,503 | A * | 7/1986 | Berger | E04B 1/98 248/544 |
| 4,887,399 | A * | 12/1989 | Berger | F24F 13/24 52/27 |
| 4,917,345 | A * | 4/1990 | Czech | F16M 7/00 248/237 |
| 5,244,264 | A * | 9/1993 | Woodard | F24F 13/32 312/100 |
| 5,647,175 | A * | 7/1997 | Smyth | E04B 7/024 52/1 |
| 5,800,631 | A * | 9/1998 | Yamada | B32B 27/306 136/251 |
| 6,044,592 | A | 4/2000 | Strieter | |
| 6,067,759 | A | 5/2000 | House | |
| 6,151,838 | A | 11/2000 | Husein | |
| 6,758,015 | B2 * | 7/2004 | Clasen | F24F 13/32 52/146 |
| 6,766,832 | B2 | 7/2004 | DiMarco | |
| 7,065,928 | B1 | 6/2006 | Lane et al. | |
| 7,232,370 | B1 | 6/2007 | Newell | |
| 7,493,729 | B1 * | 2/2009 | Semmes | E04B 1/34315 52/198 |
| 7,540,123 | B1 * | 6/2009 | Semmes | E04C 2/292 52/783.14 |
| 7,891,573 | B2 * | 2/2011 | Finkam | F24F 11/74 236/49.3 |
| 8,282,452 | B2 | 10/2012 | Grigsby et al. | |
| 8,387,319 | B1 * | 3/2013 | Gilles-Gagnon | F24S 25/615 52/173.3 |
| 8,640,477 | B1 * | 2/2014 | Merideth | F24F 13/32 62/259.1 |
| 8,701,355 | B2 | 4/2014 | Sexton | |
| 8,960,620 | B1 * | 2/2015 | Merideth | F24F 13/32 248/237 |
| 9,027,901 | B2 * | 5/2015 | Pooler | F24F 13/32 248/575 |
| 9,157,572 | B1 | 10/2015 | Merideth | |
| 9,194,613 | B2 * | 11/2015 | Nuernberger | H02S 20/10 |
| 9,217,581 | B1 * | 12/2015 | Merideth | F24F 13/32 |
| 9,228,692 | B2 * | 1/2016 | Wilson, Jr. | F16M 5/00 |
| 9,441,855 | B2 * | 9/2016 | Marks | F24F 13/32 |
| 9,625,175 | B2 * | 4/2017 | Desmond | F24F 13/32 |
| 10,443,896 | B2 * | 10/2019 | Haddock | F24S 25/615 |
| 2016/0061486 | A1 * | 3/2016 | Desmond | E04D 13/00 52/27 |
| 2016/0377318 | A1 * | 12/2016 | Marks | F24F 13/32 454/242 |

* cited by examiner

HVAC UNIT CENTERING SYSTEMS AND METHODS

CROSS REFERENCE TO RELATED APPLICATIONS

This application claims priority from and benefit of U.S. Provisional Application Ser. No. 62/722,682, filed Aug. 24, 2018, entitled "HVAC UNIT CENTERING SYSTEMS AND METHODS," which is hereby incorporated by reference in its entirety for all purposes.

BACKGROUND

The present disclosure relates generally to heating, ventilation, and/or air conditioning systems. A wide range of applications exist for heating, ventilation, and/or air conditioning (HVAC) systems. For example, residential, light commercial, commercial, and industrial systems are used to control temperatures and air quality in residences and buildings. Such systems may be dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration. In many rooftop HVAC systems, an HVAC unit may be installed on a roof curb through which the HVAC unit may receive return air and provide conditioned air to a building.

SUMMARY

The present disclosure relates to a centering system for a heating, ventilation, and/or air conditioning (HVAC) unit to be mounted to a curb. The centering system includes a centering wedge configured to couple to a base rail of the HVAC unit, the base rail having a lateral surface and a base surface along a length of the HVAC unit. The centering wedge includes an angled surface configured to extend between the lateral surface of the base rail and the base surface of the base rail. The angled surface is configured to contact the curb during installation of the HVAC unit to guide the HVAC unit toward a centered position on the curb.

The present disclosure also relates to a rooftop unit including a base rail having an interior perimeter, and a centering system configured to center a position of the rooftop unit on a roof curb. The centering system includes a plurality of centering wedges coupled to the interior perimeter of the base rail of the rooftop unit. Each centering wedge of the plurality of centering wedges includes an angled surface configured to slide along the roof curb to center the position of the rooftop unit on the roof curb during installation of the rooftop unit.

The present disclosure further relates to a heating, ventilation, and/or air conditioning (HVAC) unit including a first air opening, a base having an inner perimeter, and a centering system having a plurality of centering wedges coupled to the inner perimeter of the base of the HVAC unit and configured to center the HVAC unit on a roof curb of a building. The building includes a roof, ductwork, and a second air opening formed in the roof and fluidly coupled to the ductwork of the building. The plurality of centering wedges is configured to slide along a top surface of the roof curb to align the first air opening of the HVAC unit with the second air opening formed in the roof of the building.

DRAWINGS

DETAILED DESCRIPTION

Rooftop HVAC units are generally positioned or mounted on a roof curb, or elevated edge, of a roof of a building. When in position on the roof curb, the HVAC unit may be fluidly coupled with ductwork of the building to enable supply of conditioned air from the HVAC unit to the building and receipt of return or exhaust air from the building to the HVAC unit. Walls of the roof curb are configured to support the HVAC unit and are designed to block rain water and other debris from entering ductwork of the building. Roof curbs are generally dimensioned to fit a particular rooftop HVAC unit. As such, when a new HVAC unit is installed on a previously-existing roof curb, the existing roof curb may not properly fit the new HVAC unit. Accordingly, an adapter may be installed to couple and center the new HVAC unit onto the previously-existing roof curb. However, such adapters may be expensive, time-consuming to assembly, and may increase the height of the new HVAC unit when positioned on the adapter and roof curb. The increase in height may complicate servicing the HVAC unit and may involve substantial adjustments/repairs to utility connections. For example, an increase in the HVAC unit height on the roof curb may involve adjustment or modification of positions of HVAC unit components, such as a condensate drain, gas heat tube connections, electrical connections, and/or hot water coil connection locations.

Accordingly, the present disclosure is directed to a centering system for a rooftop HVAC unit. The centering system is a low cost system and may enable an HVAC unit to be efficiently mounted and centered on a roof curb, such as a previously-existing roof curb, while maintaining an expected elevation or height of the HVAC unit. Particularly, the HVAC unit may utilize the centering system when being placed on a roof curb that is originally dimensioned for a smaller HVAC unit. To this end, the centering system comprises a set of wedges coupled to an underside of a base rail of the HVAC unit. The set of wedges is coupled to the base rail in a configuration to enable contact between the set of wedges and the roof curb as the HVAC unit is positioned over and on the roof curb. If the HVAC unit is misaligned with the roof curb when being positioned on the roof curb, angled surfaces of the wedges may slide along the roof curb until the HVAC unit is centered on the roof curb and the roof curb is disposed between the wedges. In this manner, the centering system may be used to ensure that the HVAC unit is properly aligned with the roof curb and the ductwork surrounded by the roof curb. In particular, the proper HVAC unit alignment enabled by the centering system ensures that air flow inlets and outlets of the HVAC unit are properly aligned with the ductwork.

Figure 1:
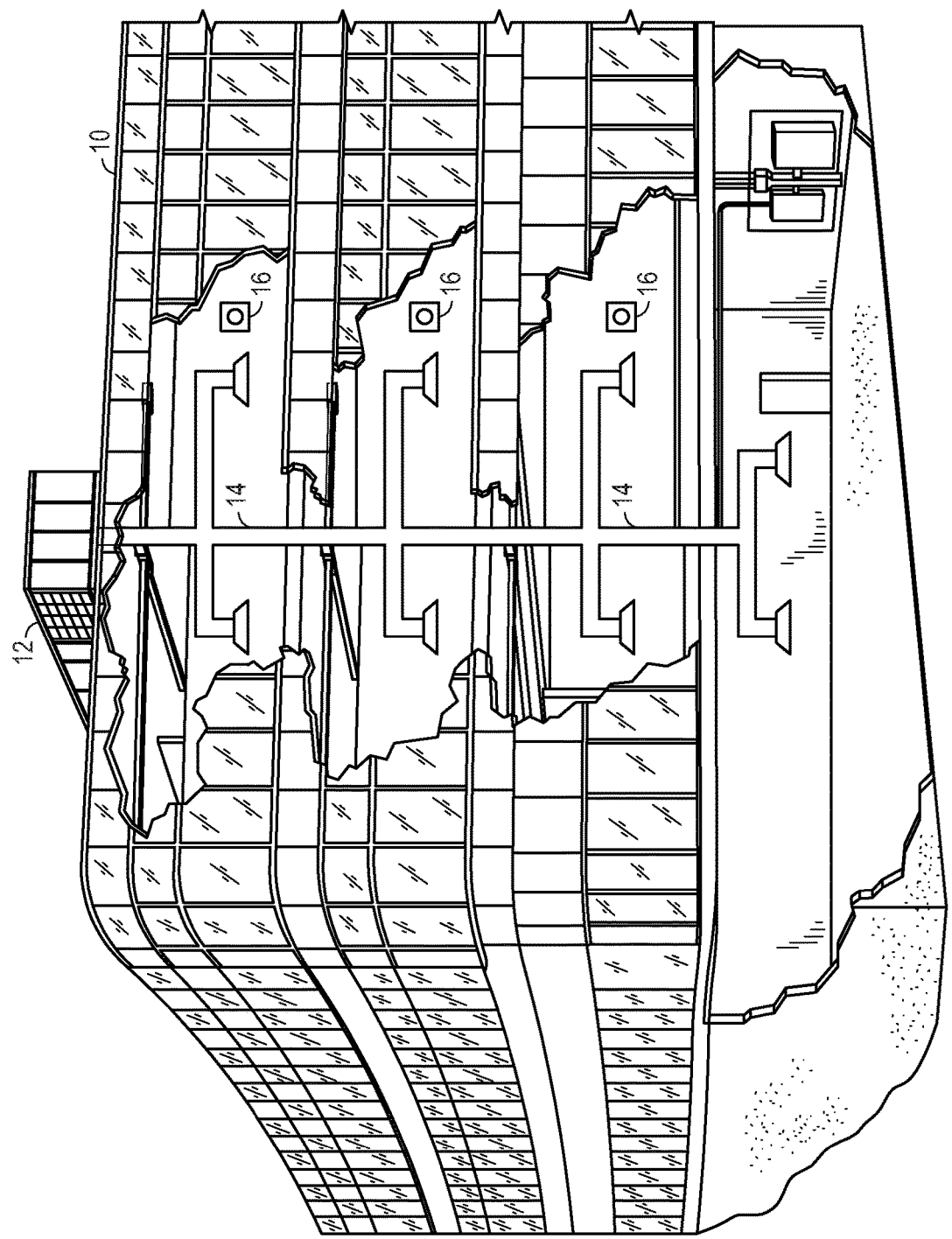
FIG. 1 is a perspective view of an embodiment of a heating, ventilation, and/or air conditioning (HVAC) system for building environmental management that may employ one or more HVAC units, in accordance with aspects of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
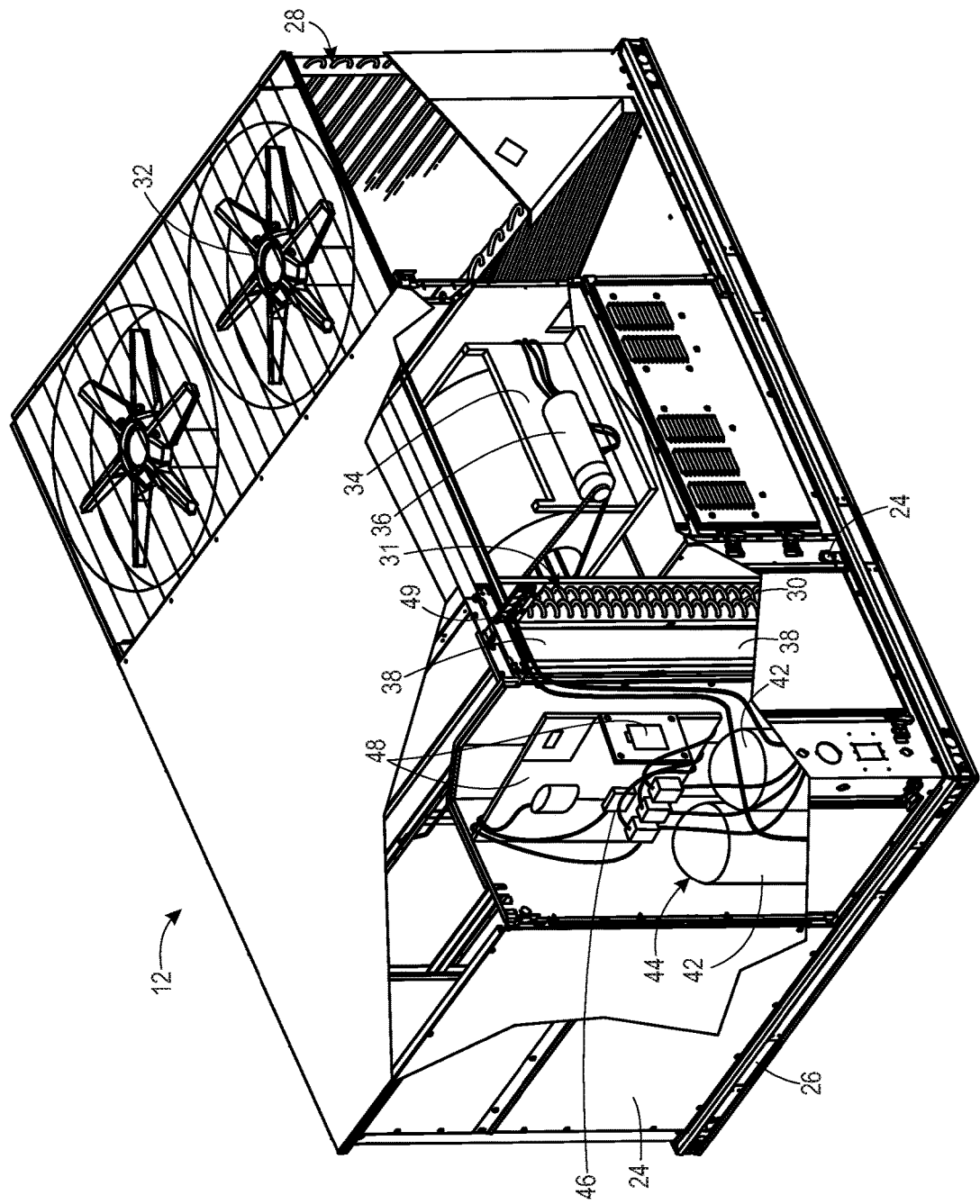
FIG. 2 is a perspective view of an embodiment of an HVAC unit, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits.

Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
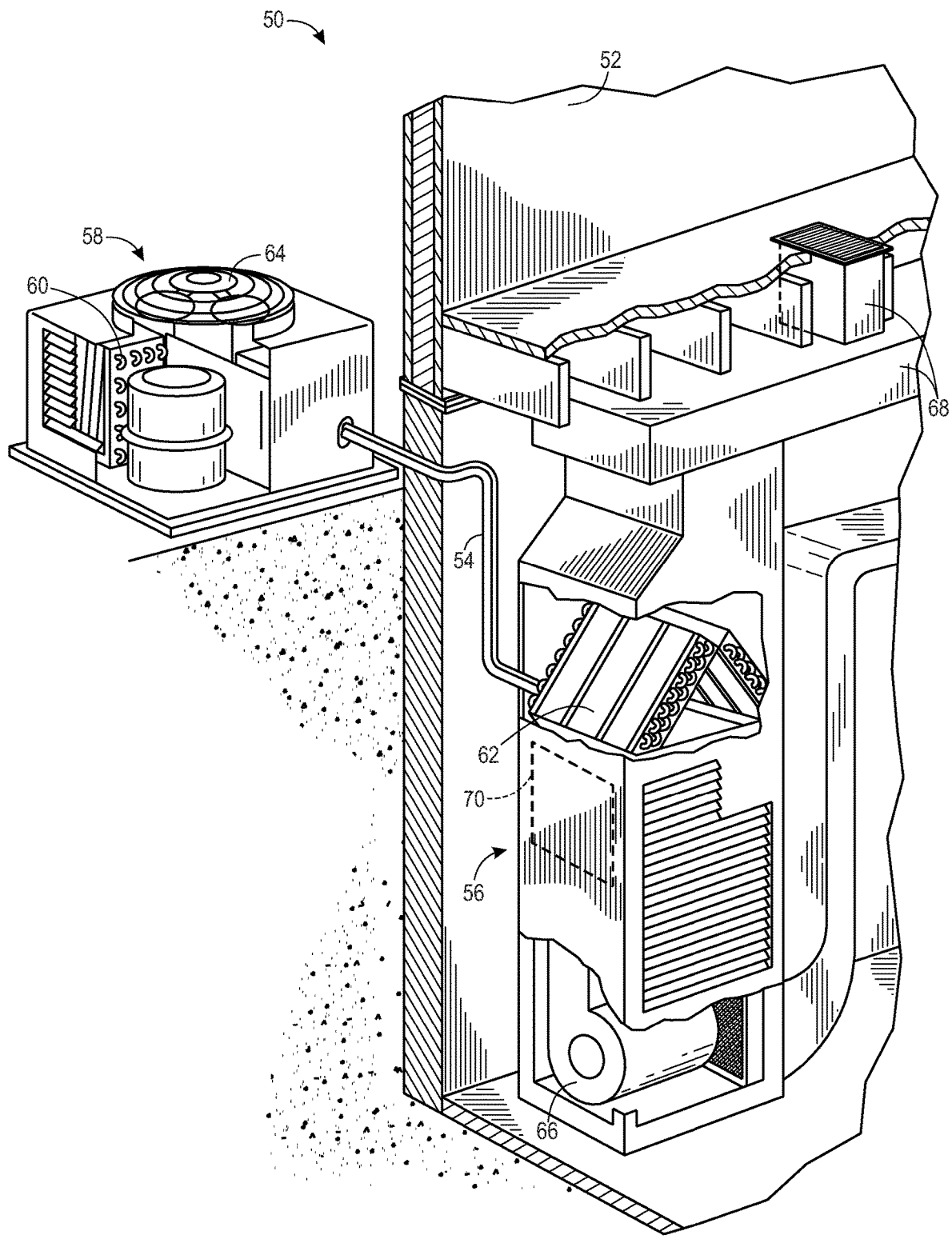
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
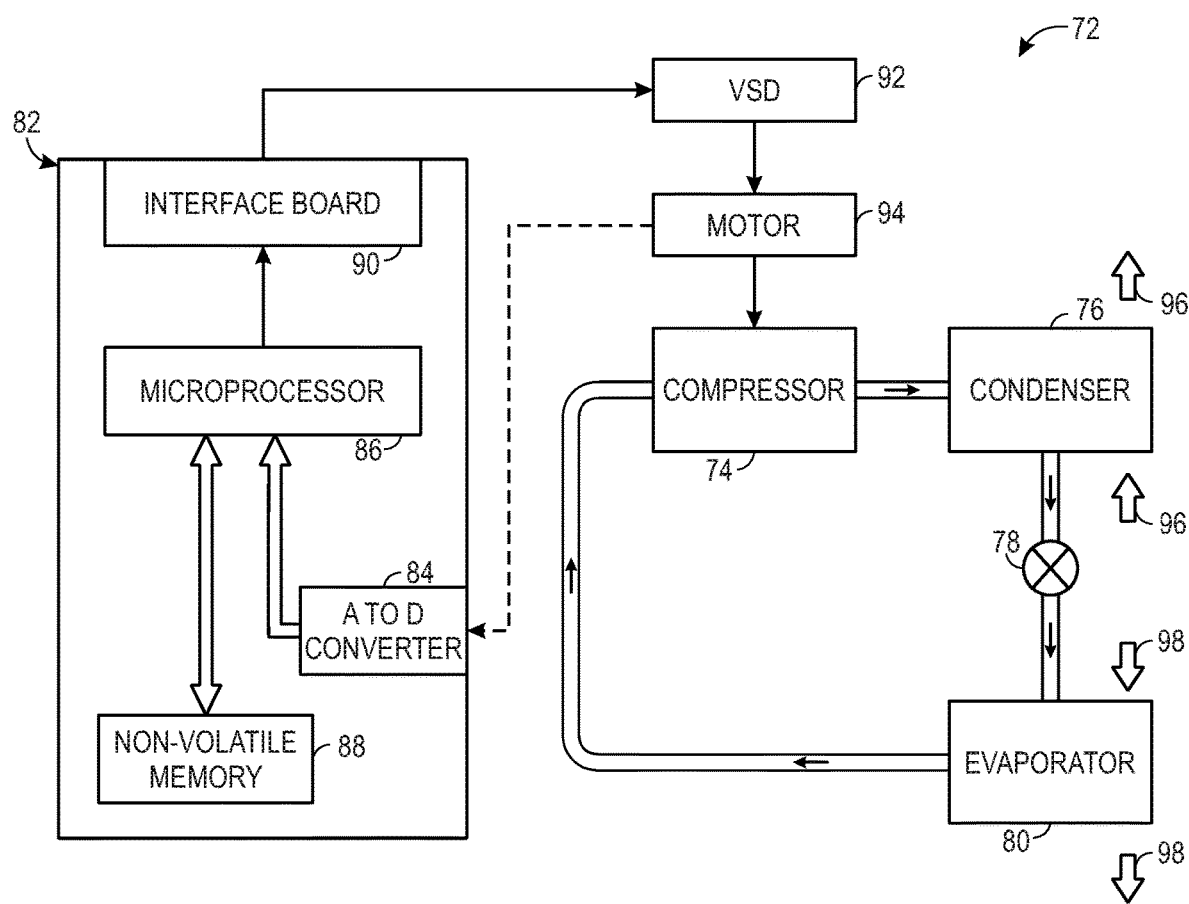
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
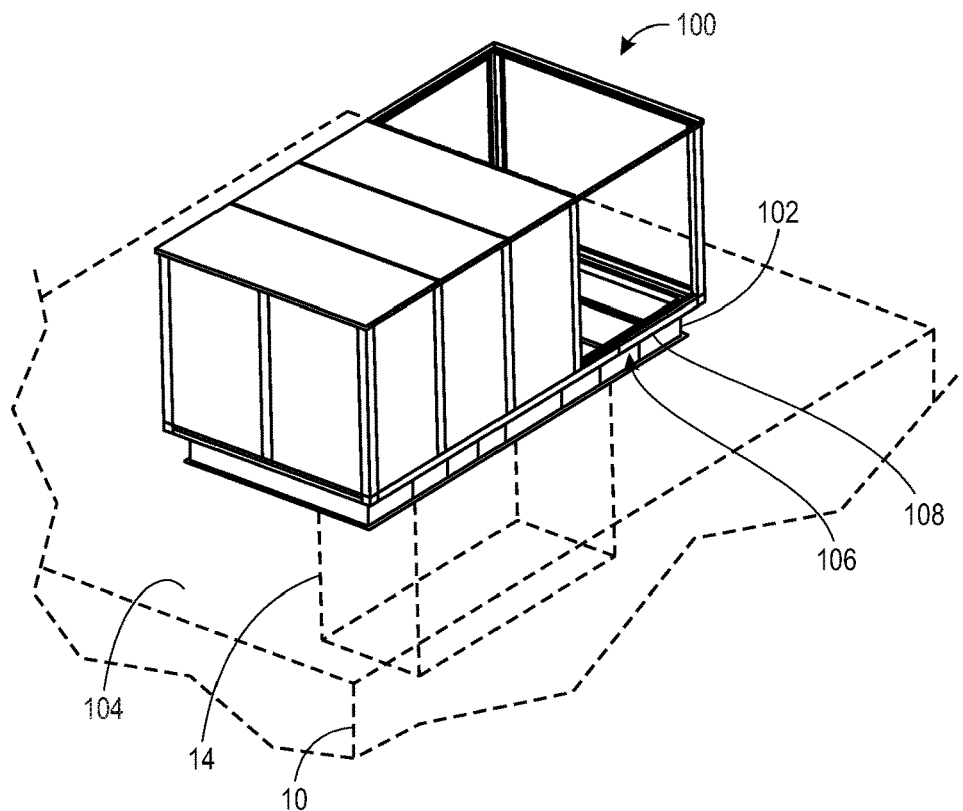
FIG. 5 is a perspective view of an embodiment of an HVAC unit centered on a roof curb via a centering system, in accordance with aspects of the present disclosure.

As discussed below, a curb-mountable HVAC unit, such as the HVAC unit 12, may include a centering system configured to align the HVAC unit with a roof curb when the HVAC unit 12 is installed and mounted onto the roof curb. To illustrate, FIG. 5 is a perspective view of an HVAC unit 100, such as the rooftop packaged HVAC unit 12 or other climate management equipment unit, disposed on a curb 102, such as a roof curb. That is, the HVAC unit 100 may be a curb-mountable HVAC unit 100 in that the HVAC unit 100 is configured to rest upon, be supported by, and/or be mounted on a curb, such as the curb 102, and provide conditioned air in a substantially downward direction through the curb, as discussed herein. Indeed, the curb 102 is designed to support the weight of the HVAC unit 100 and is fluidly coupled to the ductwork 14 of the building 10 to enable supply of conditioned air from the HVAC unit 100 to the building 10 and to enable flow of return air from the building 10 to the HVAC unit 100. More specifically, openings to the ductwork 14 may be formed in a roof 104 of the building to enable fluid communication between the HVAC unit 100 and the ductwork 14. The curb 102 is coupled to and elevated above the roof 104 of the building 10, and the curb 102 extends around the openings to the ductwork 14. As a result, the curb 102 may block rain water and other debris/contaminants from entering the ductwork 14. As shown in FIG. 5, the depiction of the HVAC unit 100 is simplified to highlight certain aspects of the HVAC unit 100 in relation to the curb 102. Indeed, although not shown, the HVAC unit 100 may include, for example, heat exchangers, a compressor, air movers, and so forth, to enable the HVAC unit 100 to manage a climate of the building 10.

As discussed herein, the HVAC unit 100 may be centered on the curb 102 utilizing a centering system 106 coupled to a base rail 108 of the HVAC unit 100. In some embodiments, the base rail 108 may be defined by the rails 26, described above. For example, the HVAC unit 100 may be lowered onto the curb 102 until the HVAC unit 100 contacts the curb 102. When the HVAC unit 100 initially contacts the curb 102, the HVAC unit 100 may be inadvertently misaligned with the curb 102. In other words, airflow openings of the HVAC unit 100 may be misaligned with corresponding airflow openings of the ductwork 14 formed in the roof 104. Accordingly, the centering system 106 may be positioned on the base rail 108 of the HVAC unit 100 to align, or center, the HVAC unit 100 on the curb 102 when a base of the HVAC unit 100 contacts the curb 102. Particularly, the centering system 106 may cause the HVAC unit 100 to slide relative to the curb 102 to center the HVAC unit 100 on the curb 102 and properly align airflow inlets/outlets of the HVAC unit 100 with the openings to the ductwork 14. In some embodiments, however, the HVAC unit 100 may be placed on the curb 102 such that the HVAC unit 100 is initially centered on the curb 102. In such embodiments, the centering system 106 may not contact the curb 102 or cause the HVAC unit 100 to move relative to the curb 102.

Figure 6:
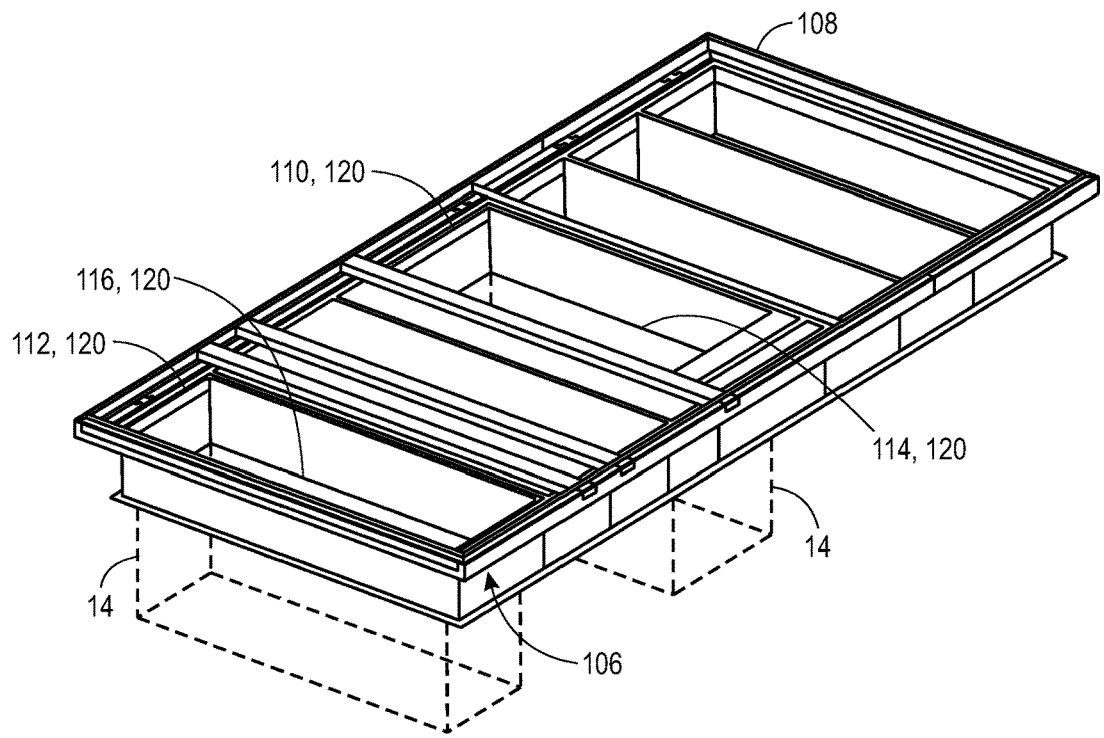
FIG. 6 is a perspective view of an embodiment of a base rail of an HVAC unit centered on a roof curb via a centering system, in accordance with aspects of the present disclosure.

Keeping this in mind, FIG. 6 is a perspective view of the base rail 108 of the HVAC unit 100 disposed on the curb 102 while in the centered position. The HVAC unit 100 includes a first supply air opening 110 configured to enable flow of supply air from the HVAC unit 100 to a second supply air opening 114 formed in the roof 104 and fluidly coupled to the ductwork 14. The base rail 108 further includes a first return air opening 112 configured to enable flow of return air into the HVAC unit 100 from a second return air opening 116 formed in the roof 104 and fluidly coupled to the ductwork 14. As discussed herein, the first supply air opening 110, the first return air opening 112, the second supply air opening 114, and the second return air opening 116 may be collectively referred to as air openings 120. Similarly, alignment or centering of the air openings 120 may refer to the relative position of the base rail 108 to the curb 102 where the first supply air opening 110 is aligned with the second supply air opening 114 and the first return air opening 112 is aligned with the second return air opening 116.

It may be particularly beneficial to center the HVAC unit 100 to align the air openings 120. For example, if the air openings 120 of the roof 104 are misaligned with the air openings 120 of the HVAC unit 100, air leaks may occur, which would decrease an efficiency of the HVAC unit 100. Accordingly, the centering system 106 is configured to center the HVAC unit 100 on the curb 102, such that the air openings 120 are aligned and air leaks are substantially blocked, prevented, inhibited, sealed, or otherwise occluded.

Figure 7:
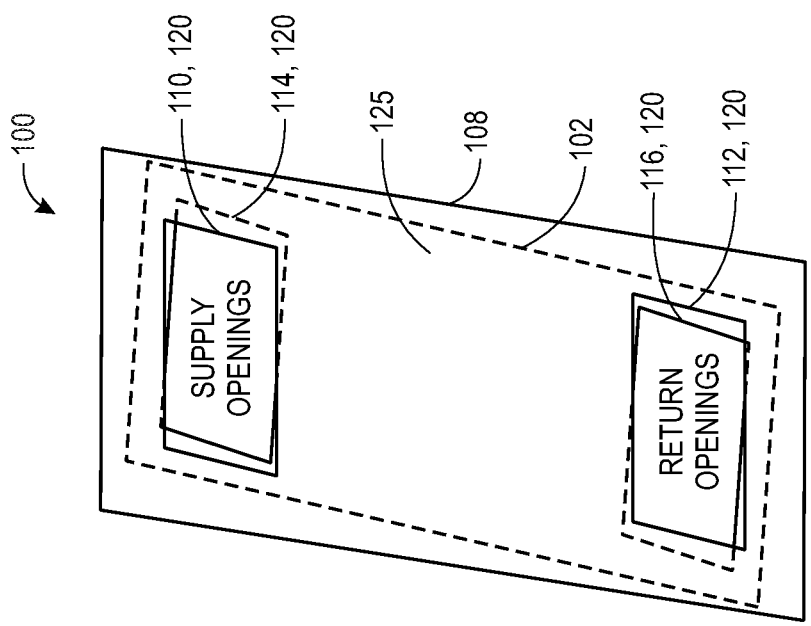
FIG. 7 is a perspective schematic view of an embodiment of a base rail of an HVAC unit positioned on a roof curb, in accordance with aspects of the present disclosure.

For example, FIG. 7 is a schematic top view of the HVAC unit 100 positioned on the curb 102 without the centering system 106 or prior to the centering system 106 engaging with the curb 102 to center the HVAC unit 100. As shown, a cross-sectional area or dimension of the base rail 108 of the HVAC unit 100 may be larger than a corresponding cross-sectional area or dimension of the curb 102. As such, when the HVAC unit 100 is positioned on the curb 102, the HVAC unit 100 may be oriented on the curb 102 such that the air openings 120 are misaligned, as shown. Indeed, due at least in part to the difference in size of the base rail 108 relative to the curb 102, the base rail 108 may have a sufficient clearance to be oriented in a variety of positions on the curb 102, which may result in misalignment of the air openings 120.

Figure 8:
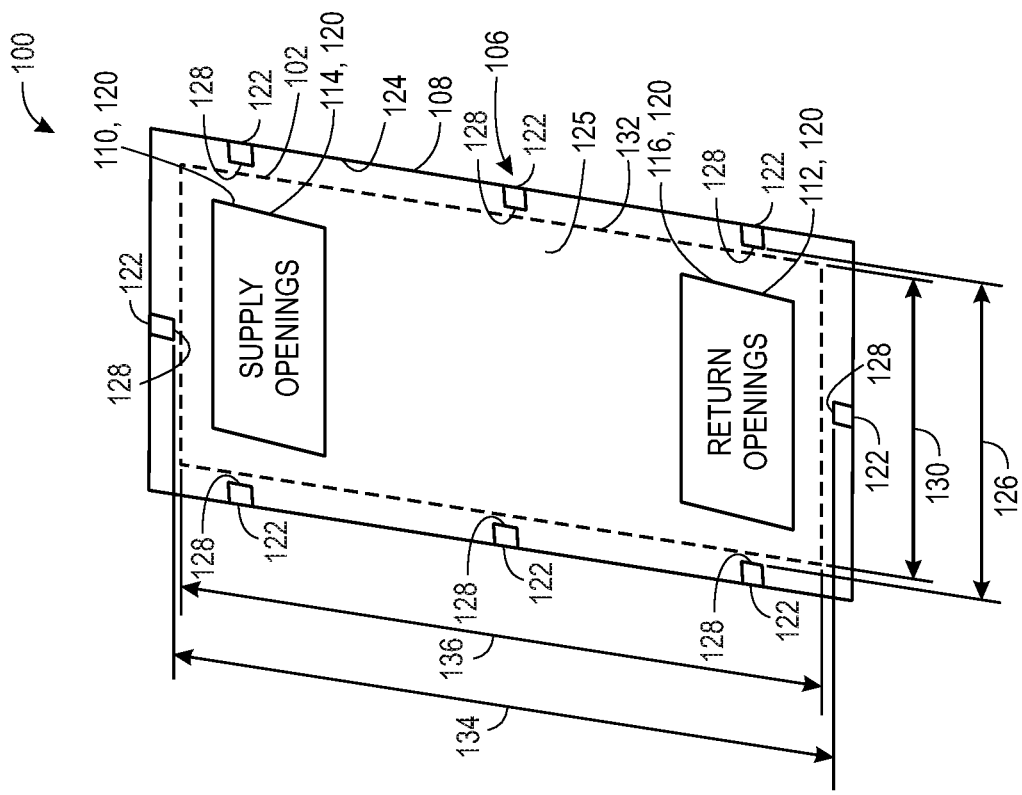
FIG. 8 is a perspective schematic view of an embodiment of a base rail of an HVAC unit centered on a roof curb via a centering system, in accordance with aspects of the present disclosure.

Keeping the foregoing in mind, FIG. 8 is a schematic view of the HVAC unit 100 in the centered position on the curb 102. As shown, the HVAC unit 100 may be centered on the curb 102 via the centering system 106. The centering system 106 includes a set of wedges 122, or centering wedges, coupled to an interior side 124, or interior perimeter, of the base rail 108 along the perimeter of the base rail 108. As discussed below, the wedges 122 may include angled surfaces configured to slide along a top surface 125 of the curb 102, in response to a weight of the HVAC unit 100, to place the HVAC unit 100 in the centered position on the curb 102. When the HVAC unit 100 is in the centered location on the curb 102, the top surface 125 of the curb 102 may be disposed within, or between, the wedges 122 of the centering system 106. Indeed, once the centering system 106 has positioned the HVAC unit 100 such that the curb 102 is positioned within/between the wedges 122, the air openings 120 of the base rail 108 and the roof 104 may be aligned, as shown. In some embodiments, the centering system 106 may include approximately eight wedges 122 spaced about the perimeter of the base rail 108, as shown. However, it should be noted that the centering system 106 may include any suitable number of wedges 122 spaced along the perimeter of the base rail 108. At a minimum, the centering system 106 may have one wedge 122 per side of the perimeter of the base rail 108. For example, in the current embodiment, perimeters of the HVAC unit 100, the base rail 108, and the curb 102 may include four sides. Accordingly, in such embodiments, the base rail 108 may include a minimum of four wedges 122, with each wedge 122 coupled approximately at the center of a side of the perimeter of the base rail 108.

The wedges 122 of the centering system 106 may be sized such that the wedges 122 are positioned between zero and one inch away from the curb 102 when the HVAC unit 100 is centered on the curb 102. For example, a centering system width 126 defined by inner edges 128 of the wedges 122 may be approximately one inch greater than a curb width 130 defined by outer edges 132 of the curb 102. Similarly, a centering system length 134 defined by the inner edges 128 of the wedges 122 may be approximately one inch greater than a curb length 136 defined by outer edges 132 of the curb 102. For example, in certain embodiments, a clearance between the outer edge 132 of the curb 102 and the inner edges 128 of the wedges 122 may be approximately 0.5 inches when the centering system 106 and the HVAC unit 100 are centered on the curb 102.

Moreover, it should be noted that the HVAC unit 100 in FIGS. 7 and 8 may appear similar when positioned on the curb 102 and observed from the external perspective. That is, it may be difficult to determine whether the HVAC unit 100 is properly aligned with the curb 102 from a bystander perspective. Accordingly, the centering system 106 may center the base rail 108 on the curb 102 and provide a degree of confidence that the HVAC unit 100 is centered on the curb 102 without substantial manual input or involvement, such as visual inspection, after the base rail 108 is placed on the curb 102.

Figure 9:
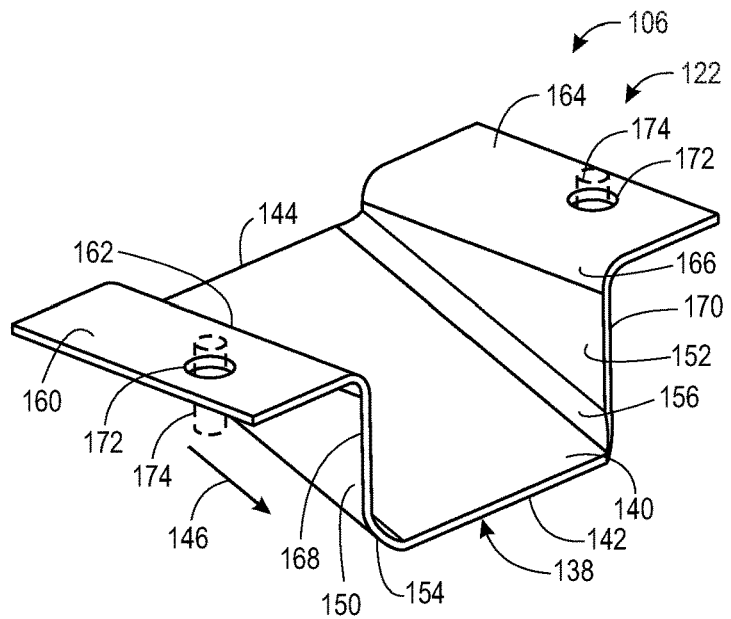
FIG. 9 is a perspective view of an embodiment of a wedge of a centering system, in accordance with aspects of the present disclosure.

FIG. 9 is a perspective view of an embodiment of one of the wedges 122 of the centering system 106. The wedge 122 is configured to contact the curb 102 via an angled, or sloped, surface 138 when the HVAC unit 100 is placed on the curb 102. The angled surface 138 includes and is defined by an angled, or sloped, plate 140 extending between a depressed edge 142 and an elevated edge 144 of the wedge 122. Once the wedge 122 contacts the curb 102, the angled surface 138 of the wedge 122 is configured to slide along the curb 102, as indicated by arrow 146, until the elevated edge 144 has moved beyond the curb 102, as discussed in further detail below.

The wedge 122 may further include a first side flange 150 and a second side flange 152 extending from the angled plate 140 via a first angled edge 154 and a second angled edge 156, respectively. That is, the first angled edge 154 and the second angled edge 156 are transitional portions of the wedge 122 coupling the angled plate 140 to the first side flange 150 and to the second side flange 152, respectively. In some embodiments, the first side flange 150 may include a first mounting flange 160, or first attachment flange, extending laterally from a first top edge 162 of the first side flange 150. Similarly, the second side flange 152 may include a second mounting flange 164, or second attachment flange, extending laterally from a second top edge 166 of the second side flange 152. In certain embodiments, as discussed further below, the first mounting flange 160 may extend laterally from a first front edge 168 of the first side flange 150. In such embodiments, the second mounting flange 164 may similarly extend laterally from a second front edge 170 of the second side flange 152. The first mounting flange 160 and the second mounting flange 164 may each include at least one aperture 172 extending therethrough. The first mounting flange 160 and the second mounting flange 164 may be coupled to the base rail 108 of the HVAC unit 100 via fasteners 174, such as a screw, bolt, nut, rivet, and/or nail, extending through the apertures 172.

Figure 10:
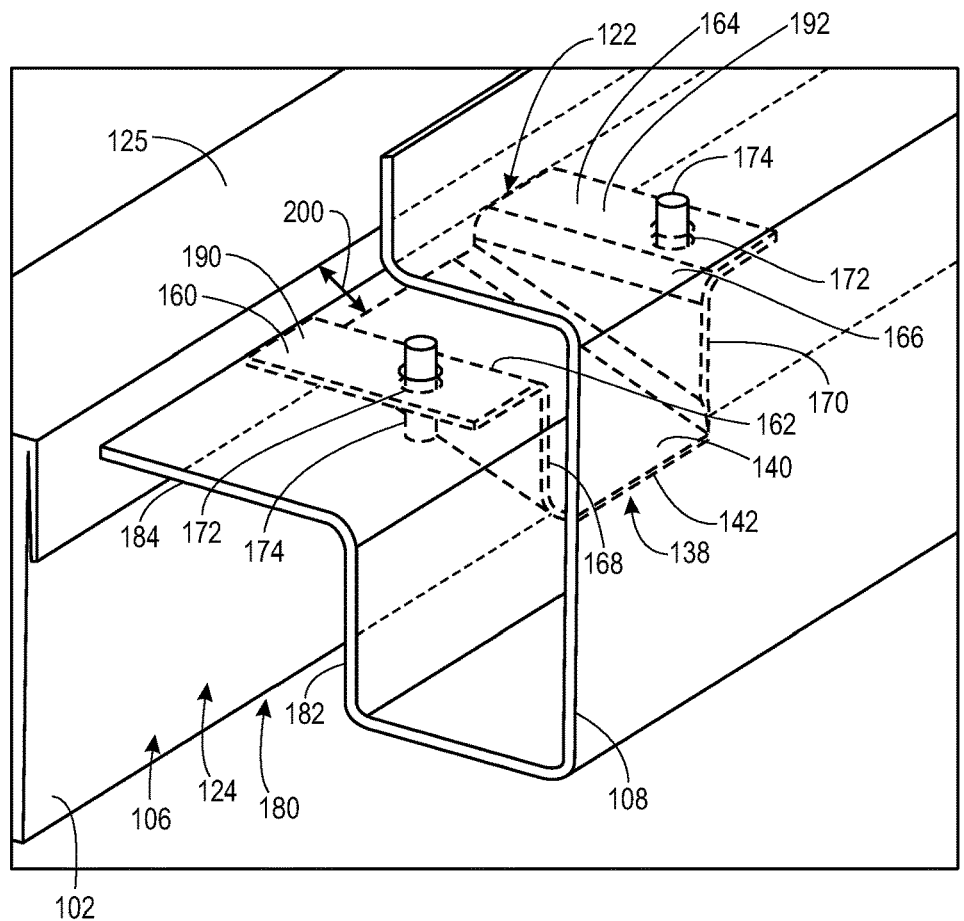
FIG. 10 is a cross-sectional perspective view of an embodiment of a base rail positioned on a roof curb with a centering wedge; in accordance with aspects of the present disclosure.
Figure 11:
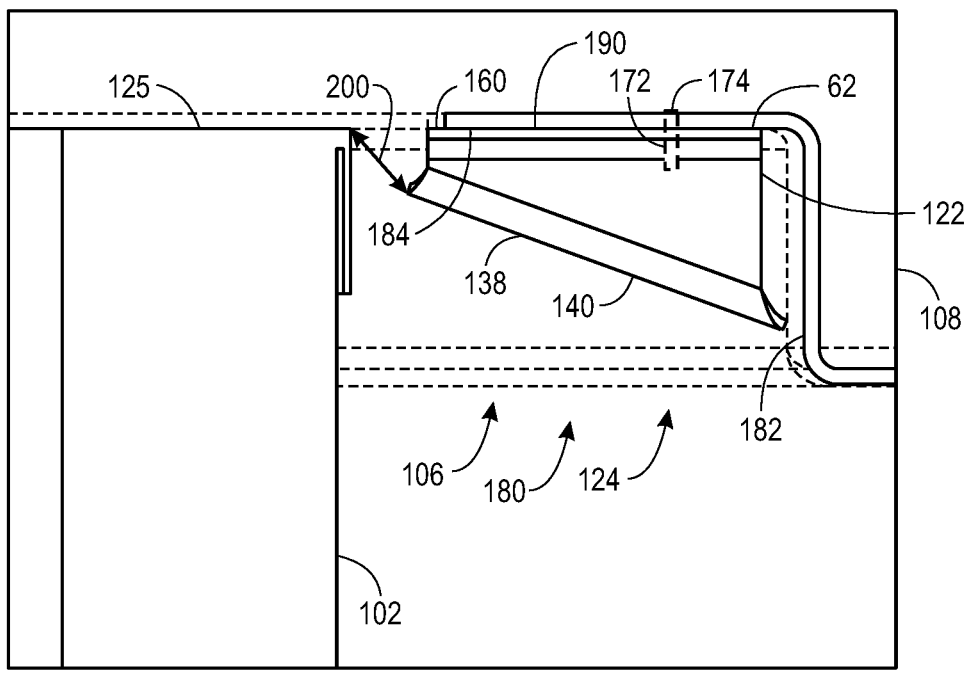
FIG. 11 is a cross-sectional side view of an embodiment of a base rail positioned on a roof curb with a centering wedge; in accordance with aspects of the present disclosure.

For example, as shown in FIGS. 10 and 11, the centering wedge 122 is coupled to an underside 180 of the base rail 108 via fasteners 174 extending through the apertures 172 of the first mounting flange 160 and the second mounting flange 164. The centering wedge 122 is coupled to the base rail 108 such that the angled surface 138 of the angled plate 140 extends between a lateral surface 182 of the base rail 108 and a base surface 184 of the base rail 108, as shown. The interior side 124 of the base rail 108 may be at least partially defined by the lateral surface 182 and the base surface 184. In the certain embodiments, the centering wedge 122 may be coupled directly to the base surface 184 of the base rail 108 via fasteners 174 extending through the apertures 172 of the first mounting flange 160 and the second mounting flange 164. As discussed below, in certain embodiments, the centering wedge 122 may be coupled directly to the lateral surface 182 of the base rail 108 via the fasteners 174 extending through the apertures 172 of the first mounting flange 160 and the second mounting flange 164.

As shown, the first side flange 150 and the second side flange 152 are each configured to abut the base surface 184 of the base rail 108 via the first top edge 162 and the second top edge 166, respectively. Moreover, the first mounting flange 160 and the second mounting flange 164 include a first mounting interface 190 and a second mounting interface 192, respectively, which are also configured to abut the base surface 184 of the base rail 108 when the wedge 122 is coupled to the base rail 108. Further, in certain embodiments, the first front edge 168, the second front edge 170, and/or the depressed edge 142 may abut the lateral surface 182 of the base rail 108 when the wedge 122 is coupled to the base rail 108. In this manner, when the base rail 108 is positioned on the curb 102, the angled surface 138 of the wedge 122 may contact the top surface 125 of the curb 102, and the first front edge, 168, the second front edge 170, and/or the depressed edge 142 may provide support to the wedge 122 against the lateral surface 182 to maintain a configuration or geometry of the wedge 122, as well as a position of the wedge 122 relative to the base rail 108.

Therefore, when the angled surface 138 of the wedge 122 contacts the top surface 125 of the curb 102, the wedge 122 may transfer a force on the wedge 122 to the base surface 184 and/or to the lateral surface 186 of the base rail 108. Particularly, while the wedge 122 moves across the top surface 125 of the curb 102, and the centering system 106 centers the HVAC unit 100 on the curb 102, the base surface 184 and/or the lateral surface 186 may provide support to the wedges 122. Once the centering system 106 has centered the HVAC unit 100 on the curb 102, the wedge 122 may have moved beyond the top surface 125 of the curb 102, such that there is a clearance 200 between the angled surface 138 of the wedge 122 and the top surface 125 of the curb 102. Moreover, once the centering system 106 has centered the HVAC unit 100 on the curb 102, the top surface 125 of the curb 102 may be substantially equal in elevation with the base surface 184 and/or may be in contact with the base surface 184. Indeed, once the HVAC unit 100 is centered on the curb 102, the wedges 122 of the centering system 106 may not support any weight of the HVAC unit 100 on the curb 102 and, in certain embodiments, may be spaced a distance apart from the curb 102, as discussed above in reference to FIG. 8.

Figure 12:
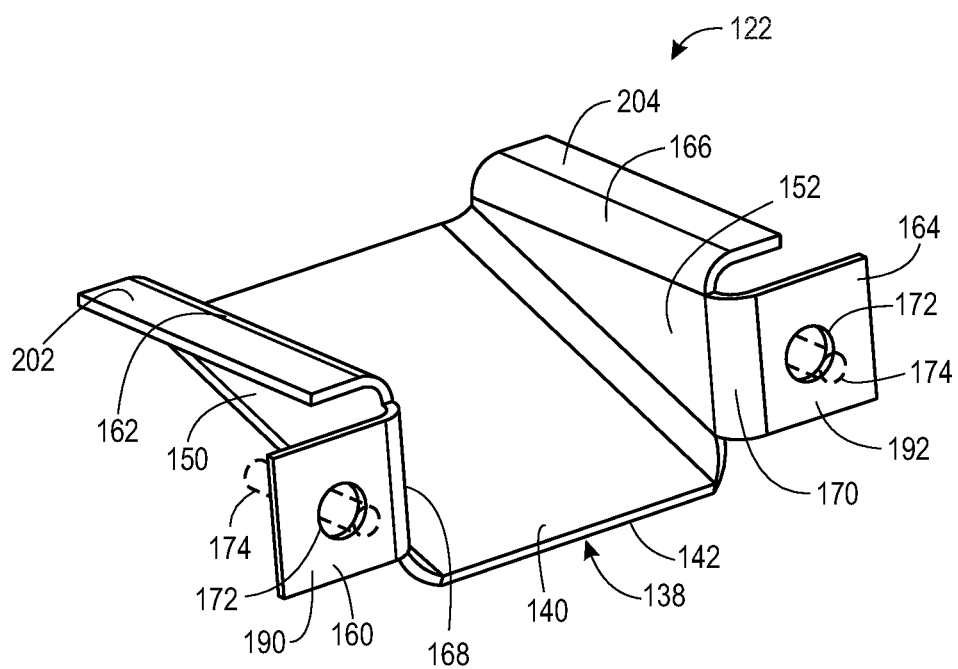
FIG. 12 is a perspective view of an embodiment of a centering wedge of a centering system, in accordance with aspects of the present disclosure.

As discussed above, the wedge 122 may be coupled to the base surface 184 of the base rail 108 via the first mounting flange 160 and the second mounting flange 164. In some embodiments, however, the wedge 122 may be coupled to the lateral surface 182 of the base rail 108 or to both the base surface 184 and the lateral surface 182. As an example, FIG. 12 is a perspective view of an embodiment of the wedge 122, which is configured to be coupled to the lateral surface 182 of the base rail 108. To this end, the first mounting flange 160 may extend laterally from the first front edge 168 of the first side flange 150, and the second mounting flange 164 may extend laterally from the second front edge 170 of the second side flange 152. The first mounting flange 160 and the second mounting flange 164 may include the apertures 172 configured to receive the fasteners 174 to couple the wedge 122 to the lateral surface 182 of the base rail 108. In such embodiments, the first mounting flange 160 and the second mounting flange 164 are configured to abut the lateral surface 182 of the base rail 108 via the first mounting interface 190 and the second mounting interface 192, respectively.

Moreover, the wedge 122 may include a first support flange 202 extending laterally from the first top edge 162 of the first side flange 150. The wedge 122 may also include a second support flange 204 extending laterally from the second top edge 166 of the second side flange 152. The first support flange 202 and the second support flange 204 are configured to abut the base surface 184 of the base rail 108. That is, the first support flange 202 and the second support flange 204 may provide support to the wedge 122 against the base surface 184 when the angled surface 138 of the wedge 122 is in contact with the top surface 125 of the curb 102 during positioning of the HVAC unit 100 on the curb 102. Moreover, the first top edge 162 and the second top edge 166 may similarly abut the base surface 184 of the curb 102 to provide support to the wedge 122.

Further, in certain embodiments, the first front edge 168, the second front edge 170, and the depressed edge 142 may abut the lateral surface 182 of the base rail 108 when the wedge 122 is coupled to the base rail 108. In this manner, when the base rail 108 is positioned on the curb 102, the angled surface 138 of the wedge 122 may contact the top surface 125 of the curb 102, and the first front edge 168, the second front edge 170, and/or the depressed edge 142 may provide support to the wedge 122 against the lateral surface 182. Indeed, in certain embodiments, the first mounting interface 190 and the second mounting interface 192 may be substantially flush with the first front edge 168, the second front edge 170, and/or the depressed edge 142.

Figure 13:
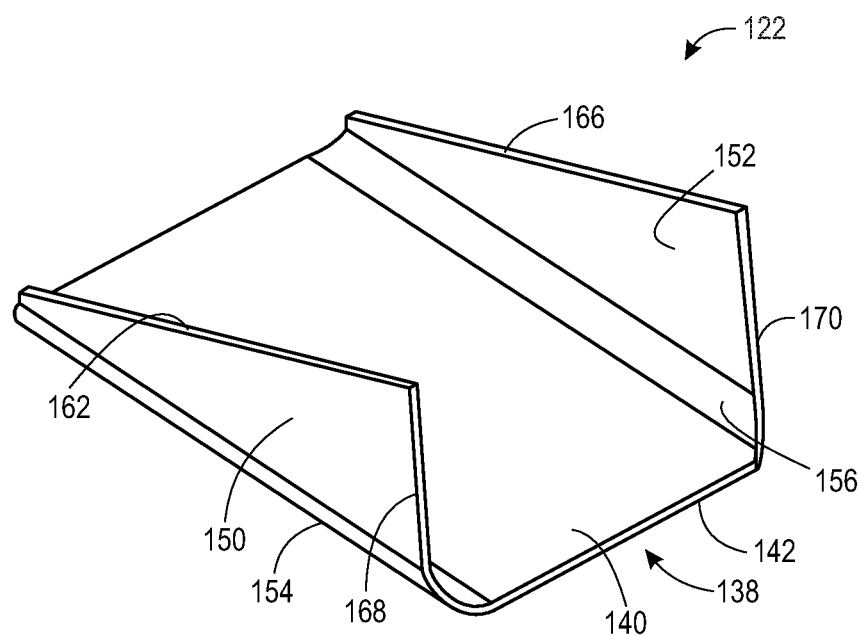
FIG. 13 is a perspective view of an embodiment of a centering wedge of a centering system, in accordance with aspects of the present disclosure.

FIG. 13 is a perspective view of an embodiment of the wedge 122. As shown, the wedge 122 may include the angled plate 140, the first side flange 150 extending from the angled plate 140 at the first angled edge 154, and the second side flange 152 extending from the angled plate 140 at the second angled edge 156. The wedge 122 may be coupled to the base rail 108 via the first top edge 162 of the first side flange 150 and the second top edge 166 of the second side flange 152 via welding or other fabrication process. Additionally, or in the alternative, the wedge 122 may be coupled to the base rail 108 via the first front edge 168 of the first side flange 150, the second front edge 170 of the second side flange 152, and/or the depressed edge 142 via welding or other fabrication process. That is, the first top edge 162 and second top edge 166 may abut, and/or be welded to, the base surface 184 of the base rail 108. Similarly, the first front edge 168, second front edge 170, and/or the depressed edge 142 may abut, and/or be welded to, the lateral surface 182 of the base rail 108. In this manner, when the angled surface 138 of the wedge 122 contacts the top surface 125 of the curb 102, the first top edge 162 and the second top edge 166 may be in contact with, or coupled to, the base surface 184 of the base rail 108 to provide support to the wedge 122. Similarly, when the angled surface 138 of the wedge 122 contacts the top surface 125 of the curb 102, the first front edge 168, the second front edge 170, and/or the depressed edge 142 may be in contact with, or coupled to, the lateral surface 182 of the base rail 108 to provide support to the wedge 122.

Generally, depending on misalignment of the HVAC unit 100 relative to the curb 102 during installation, one or more wedges 122 of the centering system 106 may center the HVAC unit 100 on the curb 102. That is, one or more wedges 122 of the centering system 106 may contact the top surface 125 of the curb 102 to cooperatively center the HVAC unit 100 on the curb 102 to align the air openings 120. Specifically, multiple wedges 122 may simultaneously be in contact with the top surface 125 of the curb 102 to collective center the HVAC unit 100. Further, in certain embodiments, the wedge 122 may be formed of a metal, such as steel, or any other suitable material configured to provide structural integrity to the wedge 122 while the wedge 122 is in contact the curb 102 to center the HVAC unit 100.

Accordingly, the present disclosure is directed to providing systems and methods for centering an HVAC unit on a roof curb via a centering system. The centering system includes a set of low cost wedges coupled to an underside of a base rail of the HVAC unit. In this manner, when the HVAC unit is placed on the roof curb, if the HVAC unit is out of alignment with the curb, the HVAC unit may contact the curb with angled surfaces of the set of wedges. The angled surfaces of the wedges may slide along the top surface of the curb until the angled surfaces slide beyond the curb, thereby centering the HVAC unit on the curb. Indeed, the centering system may be particularly useful for installing, or retrofitting, an HVAC unit on a pre-existing curb, which may not have been specifically designed for the HVAC unit being installed. Moreover, the centering system may center the HVAC unit on the curb while maintaining a height of the HVAC unit on the curb. In this manner, utility connections between HVAC unit and the curb may easily be connected. Moreover, the retained height of the HVAC unit may be conducive for servicing the HVAC unit.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A rooftop unit, comprising:
a base rail having an interior perimeter; and
a centering system configured to center a position of the rooftop unit on a roof curb, wherein the centering system comprises a plurality of centering wedges coupled to the interior perimeter of the base rail of the rooftop unit, wherein each centering wedge of the plurality of centering wedges comprises an angled surface configured to slide along the roof curb to center the position of the rooftop unit on the roof curb during installation of the rooftop unit.

2. The rooftop unit of claim 1, wherein the angled surface extends between a lateral surface of the interior perimeter of the base rail and a base surface of the interior perimeter of the base rail.

3. The rooftop unit of claim 1, wherein each centering wedge of the plurality of centering wedges comprises a first side flange extending from the angled surface toward a base surface of the interior perimeter of the base rail and a second side flange extending from the angled surface toward the base surface of the interior perimeter of the base rail.

4. The rooftop unit of claim 3, wherein the first side flange and the second side flange abut the base surface of the interior perimeter of the base rail.

5. The rooftop unit of claim 3, wherein each centering wedge of the plurality of centering wedges comprises a first attachment flange extending from the first side flange and a second attachment flange extending from the second side flange, and wherein each centering wedge of the plurality of centering wedges is coupled to the base rail via the first attachment flange and the second attachment flange.

6. The rooftop unit of claim 5, wherein the first attachment flange and the second attachment flange are coupled to the base surface of the interior perimeter of the base rail via fasteners.

7. The rooftop unit of claim 2, wherein the centering system is configured to center the position of the rooftop unit on the roof curb via contact between a top surface of the roof curb and the base surface of the base rail.

8. The rooftop unit of claim 7, wherein the centering system is configured to center the position of the rooftop unit on the roof curb to provide a clearance between the top surface of the roof curb and the angled surface of each centering wedge of the plurality of centering wedges.

9. The rooftop unit of claim 1, wherein the centering system is configured to center the position of the rooftop unit on the roof curb via contact between a first surface of the roof curb and a second surface of the base rail.

* * * * *